United States Patent
Iazikov et al.

(10) Patent No.: US 7,840,106 B1
(45) Date of Patent: *Nov. 23, 2010

(54) ETCHED SURFACE GRATINGS FABRICATED USING COMPUTED INTERFERENCE BETWEEN SIMULATED OPTICAL SIGNALS AND REDUCTION LITHOGRAPHY

(75) Inventors: Dmitri Iazikov, Springfield, OR (US); Christoph M. Greiner, Eugene, OR (US); Thomas W. Mossberg, Eugene, OR (US)

(73) Assignee: LightSmyth Technologies, Inc., Eugene, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/191,068

(22) Filed: Aug. 13, 2008

Related U.S. Application Data

(63) Continuation of application No. 12/053,537, filed on Mar. 21, 2008, now Pat. No. 7,676,128, which is a continuation of application No. 11/376,714, filed on Mar. 14, 2006, now Pat. No. 7,349,599.

(60) Provisional application No. 60/661,765, filed on Mar. 14, 2005.

(51) Int. Cl.
*G02B 6/34* (2006.01)
(52) U.S. Cl. ...................................................... 385/37
(58) Field of Classification Search .................. None
See application file for complete search history.

(56) References Cited

U.S. PATENT DOCUMENTS

| | | | |
|---|---|---|---|
| 3,995,937 A | 12/1976 | Baues et al. | |
| 4,006,967 A | 2/1977 | Kenan et al. | |
| 4,140,362 A | 2/1979 | Tien | |
| 4,387,955 A | 6/1983 | Ludman et al. | |

(Continued)

FOREIGN PATENT DOCUMENTS

| EP | 0 310 438 A1 | 4/1989 |
|---|---|---|

(Continued)

OTHER PUBLICATIONS

Hirayama et al. Applied Physics Letters, vol. 69 No. 6 p. 791 (Aug. 5, 1996).

(Continued)

*Primary Examiner*—Sarah Song
(74) *Attorney, Agent, or Firm*—David S. Alavi

(57) ABSTRACT

An optical apparatus comprises a set of diffractive elements on a substrate. They are arranged: (i) to receive an input signal propagating from an input port as a diffraction-guided optical beam, (ii) to diffract a portion of the received input signal as an output signal, (iii) to route the output signal to propagate to an output port as a diffraction-guided optical beam, and (iv) to exhibit a positional variation in diffractive amplitude, optical separation, or spatial phase over some portion of the set. The arrangement of the diffractive elements corresponds to an interference pattern derived from computed interference at a surface of the substrate between a simulated design input and output optical signals. Each diffractive element comprises at least one trench segment positioned along a path defined by a constant-phase contour of the interference pattern. Each trench segment is substantially rectangular or trapezoidal in transverse cross section.

20 Claims, 5 Drawing Sheets

U.S. PATENT DOCUMENTS

| | | | |
|---|---|---|---|
| 4,440,468 A | 4/1984 | Auracher et al. | |
| 4,660,934 A | 4/1987 | Akiba et al. | |
| 4,740,951 A | 4/1988 | Lizet et al. | |
| 4,743,083 A | 5/1988 | Schimpe | |
| 4,746,186 A | 5/1988 | Nicia | |
| 4,773,063 A | 9/1988 | Hunsperger et al. | |
| 4,786,133 A | 11/1988 | Gidon et al. | |
| 4,803,696 A | 2/1989 | Pepper et al. | |
| 4,824,193 A | 4/1989 | Maeda et al. | |
| 4,834,474 A | 5/1989 | George et al. | |
| 4,846,552 A | 7/1989 | Veldkamp et al. | |
| 4,852,960 A | 8/1989 | Alferness et al. | |
| 4,923,271 A | 5/1990 | Henry et al. | |
| 4,938,553 A | 7/1990 | Maerz et al. | |
| 5,040,864 A | 8/1991 | Hong | |
| 5,093,874 A | 3/1992 | Hawkins et al. | |
| 5,107,359 A | 4/1992 | Ohuchida | |
| 5,165,104 A | 11/1992 | Weverka | |
| 5,195,161 A | 3/1993 | Adar et al. | |
| 5,206,922 A | 4/1993 | Westland et al. | |
| 5,239,598 A | 8/1993 | Wight et al. | |
| 5,357,591 A | 10/1994 | Jiang et al. | |
| 5,450,511 A | 9/1995 | Dragone | |
| 5,453,871 A | 9/1995 | Kolner et al. | |
| 5,668,900 A | 9/1997 | Little et al. | |
| 5,768,450 A | 6/1998 | Bhagavatula | |
| 5,812,318 A | 9/1998 | Babbitt et al. | |
| 5,830,622 A | 11/1998 | Canning et al. | |
| 5,907,647 A | 5/1999 | Eggleton et al. | |
| 5,995,691 A | 11/1999 | Arai et al. | |
| 6,011,884 A | 1/2000 | Dueck et al. | |
| 6,011,885 A | 1/2000 | Dempewolf et al. | |
| 6,137,933 A | 10/2000 | Hunter et al. | |
| 6,144,480 A | 11/2000 | Li et al. | |
| 6,169,613 B1 | 1/2001 | Amitai et al. | |
| 6,169,614 B1 | 1/2001 | Whitcomb et al. | |
| 6,243,514 B1 | 6/2001 | Thompson | |
| 6,266,463 B1 | 7/2001 | Laming et al. | |
| 6,285,813 B1 | 9/2001 | Schultz et al. | |
| 6,323,970 B1 | 11/2001 | Popovich | |
| 6,408,118 B1 | 6/2002 | Ahuja et al. | |
| 6,473,232 B2 | 10/2002 | Ogawa | |
| 6,553,162 B1 | 4/2003 | Okayama | |
| 6,603,901 B1 | 8/2003 | Hale et al. | |
| 6,678,429 B2 | 1/2004 | Mossberg et al. | |
| 6,702,897 B2 | 3/2004 | Cullen et al. | |
| 6,718,093 B2 | 4/2004 | Zhou | |
| 6,768,834 B1 | 7/2004 | Gruhlke | |
| 6,813,048 B2 | 11/2004 | Kitamura | |
| 6,823,115 B2 | 11/2004 | Greiner et al. | |
| 6,829,417 B2 | 12/2004 | Greiner et al. | |
| 6,836,492 B2 | 12/2004 | Ido et al. | |
| 6,850,670 B2 | 2/2005 | Parhami et al. | |
| 6,859,318 B1 | 2/2005 | Mossberg | |
| 6,876,791 B2 | 4/2005 | Murashima et al. | |
| 6,879,441 B1 | 4/2005 | Mossberg | |
| 6,928,223 B2 | 8/2005 | Walpole et al. | |
| 6,961,491 B2 | 11/2005 | Greiner et al. | |
| 6,965,464 B2 | 11/2005 | Mossberg | |
| 6,965,716 B2 | 11/2005 | Greiner et al. | |
| 6,985,656 B2 | 1/2006 | Iazikov et al. | |
| 6,987,911 B2 | 1/2006 | Mossberg et al. | |
| 6,990,276 B2 | 1/2006 | Brice et al. | |
| 6,993,223 B2 | 1/2006 | Greiner et al. | |
| 7,003,187 B2 | 2/2006 | Frick et al. | |
| 7,009,743 B2 | 3/2006 | Mossberg | |
| 7,016,569 B2 | 3/2006 | Mule et al. | |
| 7,049,704 B2 | 5/2006 | Chakravorty et al. | |
| 7,054,044 B2 | 5/2006 | Hamano et al. | |
| 7,054,517 B2 | 5/2006 | Mossberg et al. | |
| 7,062,128 B2 | 6/2006 | Mossberg | |
| 7,116,453 B2 | 10/2006 | Mossberg | |
| 7,116,852 B2 | 10/2006 | Tuda | |
| 7,120,334 B1 | 10/2006 | Greiner et al. | |
| 7,123,794 B2 | 10/2006 | Greiner et al. | |
| 7,181,103 B1 | 2/2007 | Greiner et al. | |
| 7,190,856 B1 | 3/2007 | Iazikov et al. | |
| 7,190,858 B1 | 3/2007 | Greiner et al. | |
| 7,190,859 B2 | 3/2007 | Griener et al. | |
| 7,194,164 B2 | 3/2007 | Iazikov et al. | |
| 7,203,401 B2 | 4/2007 | Mossberg et al. | |
| 7,224,855 B2 | 5/2007 | Iazikov et al. | |
| 7,224,867 B2 | 5/2007 | Mossberg | |
| 7,260,290 B1 | 8/2007 | Greiner et al. | |
| 7,286,732 B2 * | 10/2007 | Greiner et al. | 385/37 |
| 7,292,755 B1 | 11/2007 | Greiner et al. | |
| 7,327,908 B1 | 2/2008 | Iazikov et al. | |
| 7,330,614 B1 | 2/2008 | Mossberg et al. | |
| 7,333,692 B1 | 2/2008 | Mossberg at al. | |
| 7,349,599 B1 | 3/2008 | Iazikov et al. | |
| 7,519,248 B2 * | 4/2009 | Iazikov et al. | 385/37 |
| 2002/0071646 A1 | 6/2002 | Eggleton et al. | |
| 2002/0113958 A1 | 8/2002 | Wilsher et al. | |
| 2003/0011833 A1 | 1/2003 | Yankov et al. | |
| 2003/0039444 A1 | 2/2003 | Mossberg et al. | |
| 2003/0068113 A1 | 4/2003 | Janz et al. | |
| 2003/0117677 A1 | 6/2003 | Mossberg | |
| 2004/0076374 A1 | 4/2004 | Greiner et al. | |
| 2004/0131360 A1 | 7/2004 | Iazikov et al. | |
| 2004/0170356 A1 | 9/2004 | Iazikov et al. | |
| 2004/0179779 A1 | 9/2004 | Greiner et al. | |
| 2004/0208466 A1 | 10/2004 | Mossberg et al. | |
| 2004/0258356 A1 | 12/2004 | Brice et al. | |
| 2005/0018951 A1 | 1/2005 | Mossberg et al. | |
| 2005/0063430 A1 | 3/2005 | Doucet et al. | |
| 2005/0078912 A1 | 4/2005 | Iazikov et al. | |
| 2005/0135744 A1 | 6/2005 | Greiner et al. | |
| 2005/0135745 A1 | 6/2005 | Greiner et al. | |
| 2005/0135747 A1 | 6/2005 | Greiner et al. | |
| 2005/0152011 A1 | 7/2005 | Mossberg | |
| 2005/0163425 A1 | 7/2005 | Greiner et al. | |
| 2005/0196114 A1 | 9/2005 | Xu et al. | |
| 2006/0023280 A1 | 2/2006 | Mossberg | |
| 2006/0139712 A1 | 6/2006 | Mossberg | |
| 2006/0177178 A1 | 8/2006 | Greiner et al. | |
| 2006/0193553 A1 | 8/2006 | Mossberg et al. | |
| 2006/0210214 A1 | 9/2006 | Uhlhorn et al. | |
| 2006/0233493 A1 | 10/2006 | Mossberg | |
| 2007/0019910 A1 | 1/2007 | Greiner et al. | |
| 2007/0034730 A1 | 2/2007 | Mossberg et al. | |
| 2007/0053635 A1 | 3/2007 | Iazikov et al. | |
| 2007/0154144 A1 | 7/2007 | Greiner et al. | |
| 2009/0285529 A1 * | 11/2009 | Iazikov et al. | 385/37 |

FOREIGN PATENT DOCUMENTS

| | | |
|---|---|---|
| GB | 2 168 215 | 6/1986 |
| WO | WO - 99/35523 A1 | 7/1999 |
| WO | WO - 99/56159 A | 11/1999 |
| WO | WO 02/075411 | 9/2002 |

OTHER PUBLICATIONS

Lohmann et al, Applied Optics, vol. 34 No. 17 p. 3172 (Jun. 10, 1995).

Bedford et al, IEEE Photonics Technology Letters, vol. 12 No. 8 p. 948 (Aug. 2000).

Kristjartsson etal, IEEE Photonics Technology Letters, vol. 1 No. 10 p. 1319 (Oct. 2000).

Modh et al, IEEE J. Quantum Electronics, vol. 37 No. 6 p. 752 (Jun. 2001).

Eriksson et al, IEEE J. Quantum Electronics, vol. 34 No. 5 p. 858 (May 1998).

Kazarinov et al, IEEE J. Quantum Electronics, vol. QE-23 No. 9 p. 1419 (Sep. 1987).

Eriksson et al, IEEE Photonics Technology Letters, vol. 9 No. 12 p. 1570 (Dec. 1997).
Capron et al; J. Lightwave Tech., vol. 11 No. 12 pp. 2009-2014 (Dec. 1993).
Deri et al, IEEE Photonics Tech. Lett, vol. 6 No. 2 pp. 242-244 (Feb. 1994).
Grunnet-Jepsen et al, Electon, Lett., vol. 35 No. 13 pp. 1096-1097 (Jun. 1999).
Paddon et al, Opt. Lett., vol. 23 No. 19 pp. 1529-1531 (1998).
Madsen et al, IEEE J. Sel. Top. Quant. Elec., vol. 4 No. 6 pp. 925-929 (Nov./Dec. 1998).
Gini et al, J. Lightwave Tech., vol. 16 No. 4 pp. 625-630 (Apr. 1998).
Day et al, J. Lightwave Tech., vol. 14 No. 8 pp. 1815-1824 (Aug. 1996).
McGreer, IEEE Photonics Tech. Lett., vol. 7 No. 3 pp. 324-326 (Mar. 1995).
Takenouchi et al, Optics Express vol. 6 No. 6 pp. 124-135 (Mar. 2000).
Grunnett-Jepsen et al, Photonics Tech. Lett., vol. 11 No. 10 p. 1283 (Oct. 1999).
Babbitt et al, Opt. Commun., vol. 148 pp. 23-26 (1998).
Brigham et al, Analysis of scattering from large planar gratings of compliant ctlindrical shells, J. Acoust. Soc. Am., vol. 61 No. 1 pp. 48-59 (Jan. 1977).
Kurokawa et al, Electron, Lett., vol. 33 No. 22 pp. 1890-1891 (Oct. 1997).
Sudbo et al, J. Lightwave Tech., vol. 8 No. 6 pp. 998-1006 (Jun. 1990).
Henry, J. Lightwave Tech., vol. 8 No. 5 pp. 748-755 (May 1990).
Koontz et al, Appl. Phys. Lett., vol. 71 No. 10 pp. 1400-1402 (Sep. 1997).
Song et al, Appl. Opt., vol. 34 No. 26 pp. 5913-5919 (Sep. 1995).
Brazas et al, Appl. Opt., vol. 34 No. 19 pp. 3786-3792 (Jul. 1995).
Bates et al, Appl, Opt., vol. 32 No. 12 pp. 2112-2116 (Apr. 1993).
Wang et al, Appl. Opt., vol. 32 No. 14 pp. 2606-2613 (May 1993).
Magnusson et al, Appl. Phys. Lett., vol. 61 No. 9 pp. 1022-1024 (Aug. 1992).
Ojha et al, Demonstration of low loss integrated InGaAsP/InP demultiplexer device with low polarisation sensitivity, Electron. Lett., vol. 29 No. 9 p. 805 (Apr. 1993).
Li, Opt. Commum., vol. 114 pp. 406-412 (1995).
Soole et al, Electron. Lett., vol. 31 No. 15 pp. 1276-1277 (Jul. 1995).
Rantala et al, Electron. Lett. vol. 34 No. 5 pp. 455-456 (Mar. 1998).
Cowin et al Electron. Lett., vol. 35 No. 13 pp. 1074-1076 (Jun. 1999).
Canning et al, Opt. Commun., vol. 171 pp. 213-217 (1999).
Tien et al, Use of concentric-arc grating as a thin-film spectrograph for guided waves, Am. Inst. of Physics (1980) pp. 524-525.
Kaneko et al, IEEE J. Sel. Top, Quant. Elec., vol. 5 No. 5 pp. 1227-1236 (Sep./Oct. 1999).
Sun et al, IEEE Photonics Tech. Lett, vol. 10 No. 1 pp. 90-92 (Jan. 1998).
McGreer, IEEE Photonics Tech. Lett, vol. 8 No. 4 pp. 551-553 (Apr. 1996).
Avrutsky et al, IEEE Photonics Tech. Lett., vol. 10 No. 6 pp. 839-841 (Jun. 1998).
Alavie et al, IEEE Photonics Tech. Lett., vol. 5 No. 9 pp. 1112-1114 (Sep. 1993).
Fu et al, Opt. Lett. vol. 22 No. 21 pp. 1627-1629 (1997).
Wang et al, IEEE Photonics Tech. Lett., vol. 3 No. 1 pp. 36-38 (Jan. 1991).
Wang et al Opt. Lett., vol. 15 No. 7 pp. 363-365 (Apr. 1990).
Wu et al, J. Lightwave Tech., vol. 10 No. 11 pp. 1575-1589 (Nov. 1992).
Eldada et al, IEEE Photonics Tech. Lett., vol. 12 No. 7 pp. 819-821 (Jul. 2000).
Chen et al, J. Lightwave Tech., vol. 10 No. 7 pp. 888-897 (Jul. 1992).

Minier et al, Diffraction characateristics of superimposed holographic gratings in planar optical waveguides, IEEE Photonics Tech. Lett., vol. 4 No. 10 p. 1115 (Oct. 1992).
Miya, IEEE J. Sel. Top. Quant. Elec., vol. 6 No. 1 pp. 38-45 (Jan./Feb. 2000).
Backlund et al, IEEE Photonics Tech. Lett., vol. 12 No. 3 pp. 314-316 (Mar. 2000).
Wiesman et al, IEEE Photonics Tech. Lett., vol. 12 No. 6 pp. 639-641 (Jun. 2000).
Ura et al, Integrated optical wavelength demultiplexer using a coplanar grating lens, Appl. Opt., vol. 29 No. 9 pp. 1369-1373 (Mar. 1990).
Chen et al, Ten channel single-mode wavelength division demultiplexer in the near IR, Integrated Optical Circuits, vol. 1583 pp. 134-142 (Intl. Soc. Opt. Eng., Boston, MA, USA, Sep. 1991.
Babbitt et al, Opt, Lett., vol. 20 No. 8 pp. 910-912 (Apr. 1995).
Mossberg, Opt Lett., vol. 26 No. 7 pp. 414-416 (Apr. 2001).
Tang et al, A novel wavelength-division-demultiplexer with optical in-plane to surface-normal conversion, IEEE Photonics Tech. Lett., vol. 7 No. 8 p. 908 (Aug 1995).
Brady et al, Applied Optics, vol. 30 No. 17 p. 2324 (Jun. 1991).
Preston, "Digital holographic logic", Pattern Recognition, vol. 5, p. 37 (1973).
U.S. Appl. No. 11/676,273, filed Feb. 17, 2007 in the names of Greiner et al entitled Optical interconnect structures incorporating sets of diffractive elements.
U.S. Appl. No. 12/053,537, filed Mar. 21, 2008 in the names of Mossberg et al entitled "Etched surface gratings having an effective blaze angle".
U.S. Appl. No. 12/191,068, filed Aug. 13, 2008 in the names of Iazikov et al entitled "Etched surface gratings fabricated using computed interference between . . . ".
Office Action dated Mar. 10, 2006 in formerly co-owned U.S. Appl. No. 11/055,559 (now Pat. No. 7,123,794).
Notice of Allowance dated Jun. 12, 2006 in formerly co-owned U.S. Appl. No. 11/055,559 (now Pat. No. 7,123,794).
Notice of Allowance dated Aug. 20, 2007 in formerly co-owned U.S. Appl. No. 11/685,212 (now Pat. No. 7,286,732).
Notice of Allowance dated Dec. 29, 2006 in formerly co-owned U.S. Appl. No. 11/532,532 (now Pat. No. 7,190,859).
Office Action dated Jun. 20, 2006 in formerly co-owned U.S. Appl. No. 11/062,109 (now Pat. No. 7,181,103).
Notice of Allowance dated Oct. 13, 2006 in formerly co-owned U.S. Appl. No. 11/062,109 (now Pat. No. 7,181,103).
Office Action dated Jun. 27, 2007 in formerly co-owned U.S. Appl. No. 11/676,273.
Office Action dated Jan. 15, 2008 in formerly co-owned U.S. Appl. No. 11/676,273.
Office Action dated Aug. 8, 2008 in formerly co-owned U.S. Appl. No. 11/676,273.
Office Action dated Apr. 5, 2007 in co-owned U.S. Appl. No. 11/376,714 (now Pat. No. 7,349,599).
Notice of Allowance dated Dec. 19, 2007 in co-owned U.S. Appl. No. 11/376,714 (now Pat. No. 7,349,599).
Office Action dated Sep. 30, 2008 in co-owned U.S. Appl. No. 12/053,537.
Office Action dated May 11, 2009 in co-owned U.S. Appl. No. 12/053,537.
Office Action dated Dec. 13, 2007 in co-owned U.S. Appl. No. 11/531,274 (now Pat. No. 7,519,248).
Office Action dated Apr. 30, 2008 in co-owned U.S. Appl. No. 11/531,274 (now Pat. No. 7,519,248).
Notice of Allowance dated Dec. 5, 2008 in co-owned U.S. Appl. No. 11/531,274 (now Pat No. 7,519,248).
U.S. Appl. No. 12/421,282, filed Apr. 9, 2009 in the names of Iazikov et al entitled "Transmission gratings designed by computed interference between optical signals and fabricated by reduction lithography".

* cited by examiner

ETCHED SURFACE GRATINGS FABRICATED USING COMPUTED INTERFERENCE BETWEEN SIMULATED OPTICAL SIGNALS AND REDUCTION LITHOGRAPHY

BENEFIT CLAIMS TO RELATED APPLICATIONS

This application is a continuation of U.S. non-provisional application Ser. No. 12/053,537 filed Mar. 21, 2008 now U.S. Pat. No. 7,676,128, which is in turn a continuation of U.S. non-provisional application Ser. No. 11/376,714 filed Mar. 14, 2006 (now U.S. Pat. No. 7,349,599), which in turn claims benefit of U.S. provisional App. No. 60/661,765 filed Mar. 14, 2005, each of said non-provisional and provisional applications being hereby incorporated by reference as if fully set forth herein.

BACKGROUND

The field of the present disclosure relates to optical surface gratings. In particular, surface gratings designed by computed interference between simulated optical signals and fabricated using photoreduction lithography or photoreduction lithography followed by replication, and optical devices or instruments incorporating such gratings, are disclosed herein.

One or more distributed optical structures (i.e., sets of diffractive elements) on a surficial interface may be used to angularly disperse light as a function of frequency and to also provide signal wavefront transformations. Distributed optical structures designed by computed interference between simulated optical signals are disclosed herein that may enable substantially optimized performance of such devices. Also disclosed are reduction lithographic fabrication means that allow for designed distributed optical structures to be rendered on a mask on a size scale consistent with economical and flexible spatially coherent writing means and yet fabricated on the smaller size scales necessary to support desired optical functionality.

Various embodiments, implementations, and adaptations of optical waveguides with diffractive element sets are disclosed in:

application Ser. No. 11/361,407 filed Feb. 23, 2006 in the name of Thomas W. Mossberg (now U.S. Pat. No. 7,116,453 issued Oct. 3, 2006);

application Ser. No. 11/334,039 filed Jan. 17, 2006 in the names of Thomas W. Mossberg, Christoph M. Greiner, and Dmitri Iazikov;

application Ser. No. 11/298,290 filed Dec. 9, 2005 in the names of Thomas W. Mossberg, Dmitri Iazikov, and Christoph M. Greiner (now U.S. Pat. No. 7,330,614 issued Feb. 12, 2008);

application Ser. No. 11/280,876 filed Nov. 15, 2005 in the names of Christoph M. Greiner, Dmitri Iazikov, and Thomas W. Mossberg;

application Ser. No. 11/239,540 filed Sep. 28, 2005 in the name of Thomas W. Mossberg (now U.S. Pat. No. 7,009,743 issued Mar. 7, 2006);

application Ser. No. 11/213,345 filed Aug. 25, 2005 in the names of Christoph M. Greiner, Dmitri Iazikov, and Thomas W. Mossberg (now U.S. Pat. No. 7,120,334 issued Oct. 10, 2006);

application Ser. No. 11/210,439 filed Aug. 23, 2005 in the names of Dmitri Iazikov, Christoph M. Greiner, and Thomas W. Mossberg (now U.S. Pat. No. 7,359,597 issued Apr. 15, 2008);

application Ser. No. 11/155,327 filed Jun. 16, 2005 in the names of Christoph M. Greiner, Thomas W. Mossberg, and Dmitri Iazikov (now U.S. Pat. No. 7,190,858 issued Mar. 13, 2007);

application Ser. No. 11/076,251 filed Mar. 8, 2005 in the name of Thomas W. Mossberg (now U.S. Pat. No. 7,062,128 issued Jun. 13, 2006);

application Ser. No. 11/062,109 filed Feb. 17, 2005 in the names of Christoph M. Greiner, Thomas W. Mossberg, and Dmitri Iazikov (now U.S. Pat. No. 7,181,103 issued Feb. 20, 2007);

application Ser. No. 11/055,559 filed Feb. 9, 2005 in the names of Christoph M. Greiner, Thomas W. Mossberg, and Dmitri Iazikov (now U.S. Pat. No. 7,123,794 issued Oct. 17, 2006);

application Ser. No. 11/021,549 filed Dec. 23, 2004 in the names of Dmitri Iazikov, Christoph M. Greiner, and Thomas W. Mossberg (now U.S. Pat. No. 7,260,290 issued Aug. 21, 2007);

application Ser. No. 10/998,185 filed Nov. 26, 2004 in the names of Dmitri Iazikov, Christoph M. Greiner, and Thomas W. Mossberg (now U.S. Pat. No. 6,993,223 issued Jan. 31, 2006);

application Ser. No. 10/989,244 filed Nov. 15, 2004 in the names of Christoph M. Greiner, Thomas W. Mossberg, and Dmitri Iazikov (now U.S. Pat. No. 6,961,491 issued Nov. 1, 2005);

application Ser. No. 10/989,236 filed Nov. 15, 2004 in the names of Christoph M. Greiner, Dmitri Iazikov, and Thomas W. Mossberg (now U.S. Pat. No. 6,965,716 issued Nov. 15, 2005);

application Ser. No. 10/923,455 filed Aug. 21, 2004 in the names of Thomas W. Mossberg, Dmitri Iazikov, and Christoph M. Greiner (now U.S. Pat. No. 7,054,517 issued May 30, 2006);

application Ser. No. 10/898,527 filed Jul. 22, 2004 in the named of Dmitri Iazikov, Christoph M. Greiner, and Thomas W. Mossberg (now U.S. Pat. No. 7,194,164 issued Mar. 20, 2007);

application Ser. No. 10/857,987 filed May 29, 2004 in the names of Lawrence D. Brice, Christoph M. Greiner, Thomas W. Mossberg, and Dmitri Iazikov (now U.S. Pat. No. 6,990,276 issued Jan. 24, 2006);

application Ser. No. 10/842,790 filed May 11, 2004 in the names of Thomas W. Mossberg, Christoph M. Greiner, and Dmitri Iazikov (now U.S. Pat. No. 6,987,911 issued Jan. 17, 2006);

application Ser. No. 10/798,089 filed Mar. 10, 2004 in the names of Christoph M. Greiner, Thomas W. Mossberg, and Dmitri Iazikov (now U.S. Pat. No. 6,823,115 issued Nov. 23, 2004);

application Ser. No. 10/794,634 filed Mar. 5, 2004 in the names of Dmitri Iazikov, Thomas W. Mossberg, and Christoph M. Greiner (now U.S. Pat. No. 6,985,656 issued Jan. 10, 2006);

application Ser. No. 10/740,194 filed Dec. 17, 2003 in the names of Dmitri Iazikov, Thomas W. Mossberg, and Christoph M. Greiner (now U.S. Pat. No. 7,224,855 issued May 29, 2007);

application Ser. No. 10/653,876 filed Sep. 2, 2003 in the names of Christoph M. Greiner, Dmitri Iazikov, and Thomas W. Mossberg (now U.S. Pat. No. 6,829,417 issued Dec. 7, 2004);

application Ser. No. 10/602,327 filed Jun. 23, 2003 in the name of Thomas W. Mossberg (now U.S. Pat. No. 6,859,318 issued Feb. 22, 2005);

application Ser. No. 10/229,444 filed Aug. 27, 2002 in the names of Thomas W. Mossberg and Christoph M. Greiner (now U.S. Pat. No. 6,678,429 issued Jan. 13, 2004);

application Ser. No. 09/843,597 filed Apr. 26, 2001 in the name of Thomas W. Mossberg (now U.S. Pat. No. 6,965,464 issued Nov. 15, 2005);

application Ser. No. 09/811,081 filed Mar. 16, 2001 in the name of Thomas W. Mossberg (now U.S. Pat. No. 6,879,441 issued Apr. 12, 2005).

These references indicate the state of the art available for forming diffractive elements that can in turn be used to form diffractive elements according to the present disclosure. Many of these references describe diffractive elements formed in a one- or two-dimensional optical waveguide, wherein the input or output optical signal propagates in the waveguide. Some of these references describe diffractive elements forming surface gratings, wherein both input and output optical signals propagate as diffraction-guided optical beams. For one or more of the references listed hereinabove, it may be the case that the devices, structures, embodiments, implementations, adaptations, procedures, or techniques disclosed therein may be employed, within the scope of the present disclosure or appended claims, for implementing an optical surface grating, a method for fabricating the optical surface grating, or an optical spectrometer incorporating the optical surface grating.

SUMMARY

An optical apparatus comprises a set of diffractive elements on a substrate that are arranged: (i) to receive at least a portion of an input optical signal propagating from an input optical port as a diffraction-guided optical beam, (ii) to diffract a portion of the received input optical signal as an output optical signal, and (iii) to route the output optical signal to propagate to an output optical port as a diffraction-guided optical beam.

In a first embodiment, each diffractive element comprises at least one trench between ribs projecting from the substrate surface. At least one side surface of each trench is substantially perpendicular to the bottom surface of that trench, so that the diffractive element set formed on the substrate exhibits relatively enhanced diffraction efficiency near a Littrow arrangement of the input and output optical ports relative to the substrate. The depth of at least one trench is equal to about half of its width divided by the tangent of a selected Littrow angle of incidence.

In a second embodiment, each diffractive element comprises at least one trench between ribs projecting from the substrate surface. At least one side surface of each trench and the bottom surface of that trench are arranged so as to successively reflect, from the side surface and then the bottom surface or from the bottom surface and then the side surface, a portion of the input optical signal preferentially in a selected output direction, so that the diffractive element set formed on the substrate exhibits relatively enhanced diffraction efficiency in the selected output direction.

In a third embodiment, each diffractive element of the set comprises multiple trenches between ribs projecting from the substrate surface. The arrangement of each diffractive element includes selected relative widths or depths of the multiple trenches of that diffractive element, the relative widths and depths at least in part determining diffractive amplitude of that diffractive element and a selected blaze direction in which the diffractive amplitude of that diffractive element is a maximum at a corresponding selected wavelength.

Objects and advantages pertaining to the disclosed optical surface gratings and methods of fabrication thereof may become apparent upon referring to the exemplary embodiments illustrated in the drawings and disclosed in the following written description and/or claims.

Figure 1:
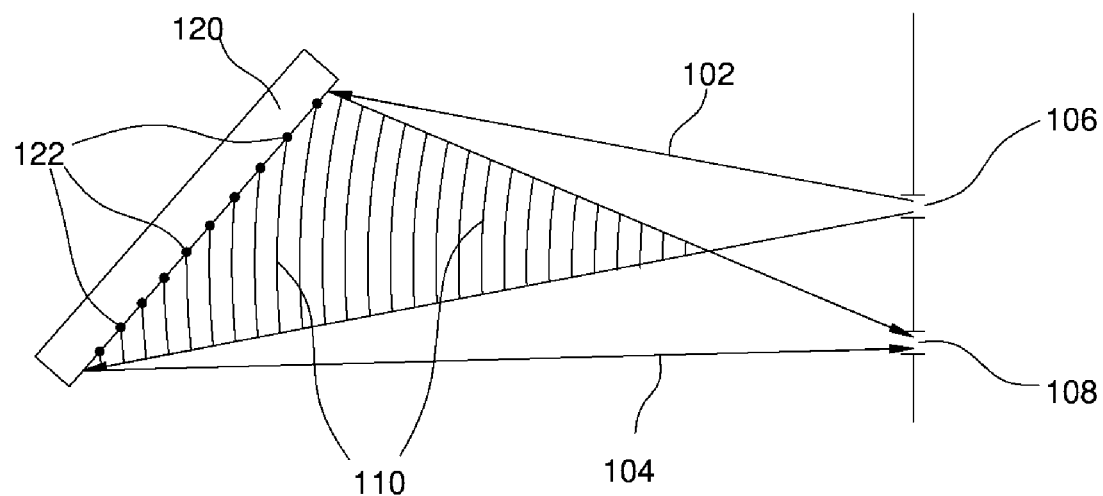
FIG. 1 illustrates schematically computed interference of optical beams at a substrate surface.

The embodiments shown in the Figures are exemplary, and should not be construed as limiting the scope of the present disclosure and/or appended claims.

Oval-like structures that may appear in various of the Figures showing diffractive element sets are artifacts of the printing/display method, and are not part of the depicted diffractive element set.

DETAILED DESCRIPTION OF EMBODIMENTS

For purposes of the present written description or appended claims, the term "diffraction-guided optical beam" shall denote an optical beam that propagates through a substantially homogeneous optical medium (material or vacuum) with a spatial wavefront that evolves according to its diffractive nature rather than by the influence of index boundaries or gradients.

An optical apparatus according to the present disclosure comprises a substrate having a surficial arrangement of diffractive elements (exposed or overcoated) arranged so as to diffract at least a portion of an input optical signal to produce an output optical signal having a different optical wavefront and exhibiting positional or angular dispersion relative to optical frequency. The surficial arrangement of diffractive elements is computationally derived from an interference pattern between a simulated input optical signal and a simulated output optical signal, and typically comprises a set of curved diffractive element contours. The output optical signal may propagate on the opposite side of the surficial arrangement of diffractive elements relative to the input optical signal (i.e., the apparatus comprises a transmissive surface grating) or on the same side (i.e., the apparatus comprises a reflective surface grating). The surficial arrangement of diffractive elements may be formed via projection lithography from a mask patterned on a different size scale or via stamping, pressing, embossing, electro-forming, or molding from a master formed via projection photolithography from the differently scaled mask.

Diffractive elements may be implemented in a variety of ways and represent generalizations of the straight ruled lines of traditional diffraction gratings. Each diffractive element of the set may comprise one or more diffracting regions thereof that diffract, reflect, scatter, route, or otherwise redirect portions of an incident optical signal (said process hereinafter simply referred to as diffraction). For a surficial diffractive structure, the diffracting regions of each diffractive element of the set typically comprise some suitable alteration of the surface (ridge, groove, index modulation, density modulation, and so on), and is spatially defined with respect to a virtual one- or two-dimensional linear or curvilinear diffractive element contour, the curvilinear shape of the contour typically being configured to impart desired spatial and spectral dispersive characteristics onto the diffracted portion of the optical signal. It should be noted that the terms "diffractive contour" and "diffractive element" are sometimes used interchangeably in the present disclosure. Implementation of a diffractive element with respect to its virtual contour may be achieved in a variety of ways, including those disclosed in the references cited herein. In some instances, each diffractive element individually transforms input signal wavefronts to the form appropriate to desired output signals. More generally, desired wavefront transformations may be effected through the coherent action of the entire diffractive element set. The relative spatial arrangement (e.g. longitudinal spacing) of the diffractive elements of the set, and the relative amplitude diffracted from each diffractive element of the set, yield desired spectral, spatial, or temporal characteristics for the overall diffracted optical signal. It should be noted that an optical port (input and/or output) may be defined structurally (for example, by an aperture, waveguide, fiber, lens, or other optical component) and/or functionally (for example, by a spatial location, convergence/divergence/collimation, and/or propagation direction). The terms input and output are used herein for describing ports for convenience only, since the optical elements involved are typically reciprocal and light could also be guided from output port to input port. When employed to spatially or spectrally disperse input signals relative to wavelength, the output port may involve multiple discrete spatial locations with different input wavelengths directed to different output spatial locations. When a plurality of wavelengths are input to the device, some or all of those wavelengths may be simultaneously detected or monitored through the deployment of a detector array whose detection elements are spatially coincident with the wavelength-specific output ports of the device. Alternatively, an output port may encompass a spatial region over which an output optical signal may be dispersed (angularly or spatially). When used without qualification, an output port may be taken to be the output port associated with a particular signal wavelength. Diffractive element sets may be arranged for transforming an input optical signal having general wavefront properties (e.g. diverging, converging, or collimated) to an output optical signal having another or the same wavefront among the set of wavefronts consistent with electromagnetic propagation.

The diffractive elements of a set (or equivalently, their corresponding contours) are spatially arranged with respect to one another so that the corresponding portions of the optical signal diffracted by each element interfere with one another so as to produce the desired output beam with its design spectral, temporal, or spatial characteristics.

As set forth in prior-filed co-pending application Ser. No. 10/998,185 (cited hereinabove), diffracting regions of a diffractive element set may be distributed over one or more discrete spatial regions of the optical element, for facilitating placement of multiple diffractive element sets in a single optical element. These spatial regions may be positioned and arranged so as to impart desired spatial, spectral, or temporal characteristics onto the corresponding diffracted portions of an incident optical signal. The word "primitive" may be used to designate one diffractive element set among multiple diffractive element sets in a single optical element (e.g., a single optical device may include multiple "primitive programmed holographic structures").

A given set of diffractive elements may provide dual functionality, i.e., spatially or angularly dispersing an optical signal and transforming its wavefront, in the course of creating an output beam via diffraction of an input beam. The diffractive elements may be designed (by computed interference of simulated signals) so as to provide optimal routing, imaging, or focusing of the optical signal between design input and output ports. Simple linear or curvilinear diffractive elements (segments of circles, ellipses, parabolas, hyperbolas, and so forth), if not optimal, may be employed as approximations of fully optimized contours. A wide range of fabrication techniques may be employed for forming the diffractive element set, and any suitable technique(s) may be employed while remaining within the scope of the present disclosure and/or appended claims. Particular attention is called to design and fabrication techniques disclosed in the references cited herein. The following are exemplary only, and are not intended to be exhaustive. The teachings of the present disclosure pertaining to design of diffractive element sets may be implemented regardless of the method(s) employed for forming the substrate and diffractive element set(s) thereof. The teachings of the present disclosure enable the design of a wide range of diffractive element sets providing for general wavefront and directional transformations between input and output beams.

Diffractive elements may be formed via projection photolithography using a mask scribed (for example as chromium on fused silica) with a size-scaled version of the diffractive element set(s) to be imparted onto a device substrate. The mask may be fabricated by any standard method including laser writing or e-beam writing, provided that the method provides spatial coherence on the length scale needed for a specific design as determined as known in the art by spectral or spatial resolution conditions. Patterns on the mask may be transferred via projection lithography to a device substrate with a transfer function that produces the design length scale and optimally preserves spatial coherence. Projection lithography wherein mask patterns are reduced in size on the substrate allow for computer-generated mask patterning on size scales convenient to standard pattern-writing tools. The diffractive elements on the device substrate may be formed using photoresist and etch methods. Diffractive elements may also be formed by molding, stamping, impressing, embossing, electro-forming, or other mechanical processes using masters patterned mechanically, via laser writing, e-beam writing, lithography, or reduction lithography.

The curvilinear shape of the diffractive element contours may be determined by calculated interference of simulated design optical beams as disclosed herein. Simple curves (e.g. conic sections) may be employed as approximations of the fully optimized contours. Diffractive element virtual contours may be spaced by an optical path difference (as described above in the cited references) that provides for the routed output of successive diffractive contours to be substantially in phase at a desired wavelength along the wavefronts of a design output signal. If the overall response of the diffractive element set is to be apodized with amplitude or phase modulation (to yield a desired spectral transfer function or impulse response function), the optical spacing of successive diffractive element contours may be controlled to provide required phase differences between corresponding routed outputs at the output port, or the diffractive strength of the elements may be individually or collectively controlled as well using partial scribing or correlated line set methods (as described in detail in the references cited hereinabove).

A surficial diffractive element set for transforming a design optical input signal into a design optical output signal may be designed by calculating an interference pattern between simulated input and output optical signal fields. The simulated fields are formulated at a desired wavelength with desired spectra, temporal waveforms, or spatial wavefronts. The simulated fields propagate as diffraction-guided optical beams toward, through, or away from a diffracting volume, and the interference pattern is computed over a design diffracting surface in the diffracting volume. In various useful cases, the simulated beams may be monochromatic, may be continuous-wave, or may have a time-dependent simulated temporal waveform. In forming or writing a mask pattern for the diffractive element set, suitable discretization is applied as needed for any lithographic or mechanical methods utilized for fabrication. For example, interference between a delta-function-like pulse and a desired reference optical waveform (or its time-reverse) may be calculated, and the resulting interference pattern used to fabricate a diffractive element set that acts to either recognize or generate the desired reference optical waveform. It should be noted that the maximal temporal duration of a waveform to be generated or recognized by use of the thus-derived grating is related to the angle between design input and output optical signals, and is typically zero for copropagating design waveforms and maximal for counter-propagating design waveforms. Various exemplary embodiments of such interferometric design of diffractive element sets are set forth hereinbelow, in the accompanying Figures, and in the references cited hereinabove listed above. In various of the exemplary embodiments of the present disclosure, the spectral or temporal properties of the input signal is preserved in the output signal. To achieve this, it is desirable to employ simulated design fields having temporal widths short enough to span the design operational bandwidth. Alternatively, diffractive element sets designed using continuous-wave simulated design fields may be spatially apodized according to the incorporated references listed above to provide desired spectral or temporal transformation properties.

The phrase "operationally acceptable" appears herein describing levels of various performance parameters of substrates and diffractive element sets thereof. Such parameters may include optical coupling coefficient (equivalently, optical coupling efficiency), diffraction efficiency, etch depth, undesirable optical mode coupling, optical loss, and so on. An operationally acceptable level may be determined by any relevant set or subset of applicable constraints and/or requirements arising from the performance, fabrication, device yield, assembly, testing, availability, cost, supply, demand, and/or other factors surrounding the manufacture, deployment, and/or use of a particular assembled optical device. Such "operationally acceptable" levels of such parameters may therefore vary within a given class of devices depending on such constraints and/or requirements. For example, lower diffraction efficiency may be an acceptable trade-off for achieving lower device fabrication costs in some instances, while higher diffraction efficiency may be required in other instances in spite of higher fabrication costs. In another example, higher optical loss (due to scattering, absorption, undesirable optical coupling, and so on) may be an acceptable trade-off for achieving lower device fabrication cost or smaller device size in some instances, while lower optical loss may be required in other instances in spite of higher fabrication costs and/or larger device size. Many other examples of such trade-offs may be imagined. Optical devices and fabrication methods therefor as disclosed herein, and equivalents thereof, may therefore be implemented within tolerances of varying precision depending on such "operationally acceptable" constraints and/or requirements. Phrases such as "substantially uniform", "substantially spatial-mode-matched", "so as to substantially avoid undesirable optical coupling", and so on as used herein shall be construed in light of this notion of "operationally acceptable" performance.

In the present disclosure are disclosed methods for designing and fabricating diffractive element sets as well as a broad range of diffractive element set geometries. Diffractive element sets designed according to the disclosed methods may efficiently map or couple virtually any diffraction-guided input optical wavefront into any desired diffraction-guided output optical wavefront, whether the input and output signals propagate in the same, opposite, or in angled directions, whether the input and output ports or sources are spatially extended or point-like, or whether the input-to-output mapping or coupling occurs under conditions wherein a paraxial approximation would be appropriate. In order to achieve optimal or near-optimal mapping or coupling of input and output optical signal modes, the virtual contours defining the diffractive elements are typically complicated and are derived by computation of interference between simulated optical fields representing the input and output optical signal beams that the diffractive element set is intended to couple.

The surficial diffractive element sets (also referred to as surficial distributed optical structures or optical surface gratings) designed as disclosed herein may provide substantially full waveform reconstruction and/or manipulation of input fields. Such may be achieved under conditions (e.g. non-paraxial limit or extended optical sources) where simple imaging structures (e.g. conic sections) may not provide sufficiently optimized mapping or coupling, and may enable substantially optimized beam routing or highly efficient coupling to various output media (e.g. fiber or channel waveguides). Such waveform control is useful in separating angularly dispersed optical output signals. The ability of the distributed diffractive optical element to disperse and spatially separate, e.g. via focusing, eliminates the need for additional optical elements in spectrometer-type devices where extra focusing mirrors or lenses may traditionally be employed and eliminates the need for non-planar focusing distributed diffractive structures previously known to the art, e.g. concave gratings. Diffractive element sets designed as disclosed herein may also enable high-fidelity mapping of spatially extended optical sources (i.e. non-paraxial or non-point-like), or may enable novel beam mapping or coupling functions, such as efficiently converting one mode into another one of different size or profile.

FIG. 1 illustrates schematically a method for designing a set of surficial diffractive elements for generating a desired output optical signal beam from a desired input optical signal beam incident on the diffractive element set. At the wavelength of interest, a mathematically-simulated design input optical field 102 exhibiting spatial and spectral properties of the desired input optical signal beam is computationally interfered with a mathematically-simulated design output optical field 104 exhibiting spatial and spectral properties of the desired output optical beam. The resulting interference pattern 110 is computed over a design diffracting surface coinciding with the surface of a device substrate 120. The arrangement of diffractive elements 122 on the surface of device substrate 120 is computationally derived from the computed interference pattern 110. The simulated input and output beams 102 and 104 are depicted as passing through respective schematic ports 106 and 108 on entry and exit. "Mathematically-simulated" may denote an optical signal simulated analytically or numerically, while "computation" may denote analytical computation or numerical computation. The input and output fields (denoted by subscripts 1 and 2, respectively) may be given by the real part of:

$$E_{1,2}(\bar{x}, t) = S_{1,2}(\bar{x})T_{1,2}\left(t - \frac{\partial \bar{k}_{1,2}(\bar{x})}{\partial \omega_{1,2}} \cdot \bar{x}\right)\exp i(\omega_{1,2}t - \bar{k}_{1,2}(\bar{x}) \cdot \bar{x}) \quad (1)$$

where $S_i$ is a spatial mode field amplitude distribution, $T_i$ is a temporal envelope, $\omega_i$ is the optical frequency, $k_i$ is the modal wavevector spatial distribution, and $\partial k_i/\partial \omega_i$ is the inverse of the group velocity. Note that $S_i$ and $k_i$ are related in a manner that satisfies Maxwell's equations, while $\omega_i$, $k_i$, and $\partial k_i/\partial \omega_i$ are related by the dispersion properties of the medium in which the signals propagate. In general the product of $S_i$ and $T_i$ may be normalized in any suitable way. If the optical signals are continuous-wave (cw), then $T_i$ is constant for both signals (assume $T_i=1$). In a first computational step for such continuous-wave optical signals with $\omega_1 \cong \omega_2$, an optical interference pattern between the two optical signal fields is calculated as:

$$\begin{aligned}I(\bar{x}, t) &= (E_1(\bar{x}, t) + E_2(\bar{x}, t))(E_1(\bar{x}, t) + E_2(\bar{x}, t))^* \\ &= |S_1(\bar{x})|^2 + |S_2(\bar{x})|^2 + 2|S_1(\bar{x})||S_2(\bar{x})|\cos(\Delta \bar{k}(\bar{x}) \cdot \bar{x} + \varphi(\bar{x}))\end{aligned} \quad (2)$$

where $\Delta k \equiv k_2 - k_1$ and $\phi \equiv \mathrm{Arg}(S_1 S_2^*)$ (all functions of position). Designs for various types of diffractive element sets may be derived from the interference pattern in several ways. In many examples (but not all), the first two terms of Eq. 2 are discarded, and a diffractive element design is derived from the third term of Eq. 2 (referred to as the interferogram, which physically spans the diffracting volume).

For the specific case of two interfering fields, the interferogram may be decomposed into three factors: a first magnitude factor $|S_1(x)|$, which spatially varies in proportion to the magnitude of the simulated design input optical field; a second magnitude factor $|S_2(x)|$, which spatially varies in proportion to the magnitude of the simulated design output optical field; and a phase factor $\cos(\Delta k \cdot x + \phi)$, which depends on the phase difference between the simulated design input and output optical fields and which typically varies spatially on a relatively rapid scale. The product $|S_1(x)||S_2(x)|$ may be referred to as the interferogram intensity function, while $\cos(\Delta k - x + \phi)$ may be referred to as the interferogram phase function. In many instances only the interferogram phase function is employed for designing a diffractive element set, while in other instances the interferogram intensity function or one of the individual magnitude factors may be employed as well. It is understood that the mathematical expression given for simulated design input and output fields is only one possible expression for such fields and others may be used as well. In all cases, an interference pattern may be calculated, which may be decomposed into terms analogous to those given above. Any suitable mathematical expressions for simulated design optical beams or the resulting interference pattern or interferogram shall fall within the scope of the present disclosure. In the calculation of surficial diffractive structures, it is the intersection of the full three-dimensional interference pattern 110 (in the case that the input and output beams are diffraction-guided beams) with the surface of substrate 120 that forms the basis of the derived arrangement of the diffractive elements 122. Waveguide-confined optical signals are discussed in the above-cited references.

Simulated optical fields used for interference pattern computation may be realizable by physical sources, however, the present disclosure also encompasses use of simulated optical design fields that are theoretical and may or may not be conveniently obtainable with actual light sources or in the geometries of interest. Moreover, when using actual optical signals to generate an interference pattern, it is not possible to drop the first two terms of Eq. 2 to isolate the interferogram, as is possible when using simulated optical signals. Many of the exemplary embodiments shown and described herein may include the use of only two simulated design fields to generate the interference pattern. More generally, three or more simulated optical fields may be employed for forming an interference pattern and for designing diffractive element sets, and such use of three or more simulated design optical fields shall fall within the scope of the present disclosure or appended claims. Such multi-beam-interference-designed distributed optical structures may be useful for coupling multiple input signals to a single output beam, a single input signal to multiple output beams (i.e. an optical splitter), or multiple inputs each to one or more outputs.

An arrangement for a diffractive element set may be computationally derived from the interferogram as it intersects the design surface of interest. A diffractive element set on a substrate (flat, as is most lithographically convenient, or curved) may be regarded as a two-dimensional spatial distribution of optical-field reflection strength, which may also be referred to as a diffractive strength distribution. The diffractive strength distribution is derived computationally from the interferogram by any desired well-defined mapping of the value of the interferogram (either as originally generated from the simulated fields or suitably modified thereafter) at a given position to an optical field reflection coefficient value at that position. The diffractive strength distribution may be realized physically in various ways, many of which are described in the various references cited hereinabove, some of which are described hereinbelow. Typically, a diffractive element set comprising the diffractive strength distribution is fabricated in the form of a two-dimensional surface relief structure. Such a distribution may be fabricated in various ways, e.g. by etching trenches. The surface relief structure may act as a reflective surface grating, relying on material index contrast for reflectivity or having a reflective metal or dielectric coating. Alternatively, the surface relief structure may act as a transmission surface grating, and may be overcoated with a substantially transparent dielectric layer sufficiently thick to fill or partially fill surface features resulting in a robust nearly flat final surface, if needed or desired. A reflective surface grating may also be overcoated with a substantially transparent protective layer, if needed or desired.

It may often be the case that the diffractive element set (or equivalently, the diffractive strength distribution or the refractive index distribution) may be designed and formed according to the computed interferogram phase function alone. The phase function may be translated or mapped into a suitable refractive index distribution or partially reflective interface distribution either by faithfully replicating the explicit functional dependence of the trigonometric function of the phase difference, or by approximating the trigonometric function of the phase difference by other functions such as a step function, sawtooth function, a triangular function, or other approximating function, or by any other suitable algorithm.

Figure 2:
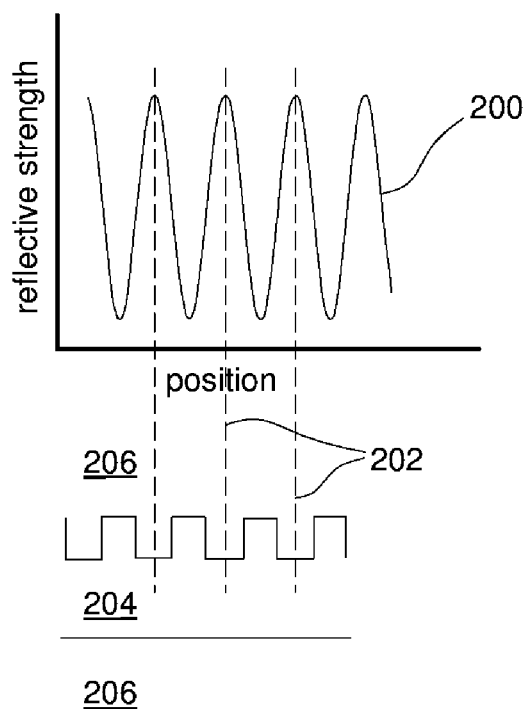
FIG. 2 illustrates schematically an exemplary interferogram phase function and a diffractive element set arrangement derived therefrom.

Alternatively, the continuous, analog phase function may be approximated by a finite number of discrete levels of diffractive strength or refractive index variation. In one example, the phase function of the interferogram may be digitized by using only points corresponding to local maxima of the phase function 200 (as in the upper portion of FIG. 2). The resulting set of contours comprises contour lines on which the phase difference between the two interfering simulated optical beams is zero. Contours defined by values other than zero for the interferogram phase function could be employed as well. A set of diffractive elements may be fabricated by forming diffractive elements positioned relative to these virtual contours so as to yield a desired spectral or temporal transfer function for the diffractive element set. For example, trenches 202 (shown in cross-section in the lower portion of FIG. 2) may be etched on the substrate 204 along the zero-phase-difference contours. The computed contour line may be used as a center or an edge or another part of the trench constituting the diffractive element. For the exemplary embodiment of FIG. 2, one suitable value for the width of the trench might be one half the contour spacing. Other suitable trench widths may be employed as well, and the trench width may be varied to control the reflective amplitude of each diffractive element. The width of each trench may be varied along its length to introduce lengthwise diffractive amplitude control. Also the contour may be broken into a multiple segments which are displaced normal to the contour tangent so as to enable interferometric control of diffractive amplitude, as described in various of the above-cited references. The positioning of etched trenches relative to constant phase contours of the interferogram function may also be varied from contour to contour to control the relative diffractive phase of each diffractive element. Control of the diffractive element amplitude and phase provide for the precise tailoring of the input-to-output wavefront transfer function.

The calculated interferogram intensity function or one or both of the individual magnitude factors thereof may be utilized in several different ways for designing a diffractive element set. In a first example, as already disclosed hereinabove, the calculated interferogram intensity function may not be used at all but rather set to unity, so that the design of the diffractive element set is derived from the interferogram phase function only. In a second example, when calculating the diffractive strength distribution for a diffractive element set, the calculated interferogram intensity function $|S_1(x)||S_2(x)|$ may be used in combination with the interferogram phase function. In this second example, along the zero phase difference (or other chosen constant phase difference) contours, the value of the diffractive strength distribution varies in proportion to the product of the simulated design optical field magnitudes. In a variation of this second example, a relative scaling factor for the simulated field magnitudes may be introduced which may be a constant or which may vary with position. In a third example, the magnitude of one or the other (but not both) of the simulated optical fields may be employed along with the interferogram phase function to generate the diffractive strength distribution. In a fourth example, the interferogram intensity function may be replaced by an entirely different intensity function (chosen to yield a desired spatial, spectral, or temporal transfer function and often referred to as an apodization function), combined with the interferogram phase function, and translated into a diffractive strength distribution. For example, to produce an output signal in the form of the simulated output signal from an input signal having the form of the simulated input signal, the interferogram intensity function is replaced with a function proportional to $|S_2(x)|/|S_1(x)|$. Generally, a wide range of relationships between input and output optical signals may be achieved by generating a diffractive strength distribution that is a product of the interferogram phase function and a spatially varying phase and amplitude weighting function. The relationship between the weighting function and the diffracted output signal can be determined by diffractive calculations known in the art. Examples are described further hereinbelow.

Figure 3:
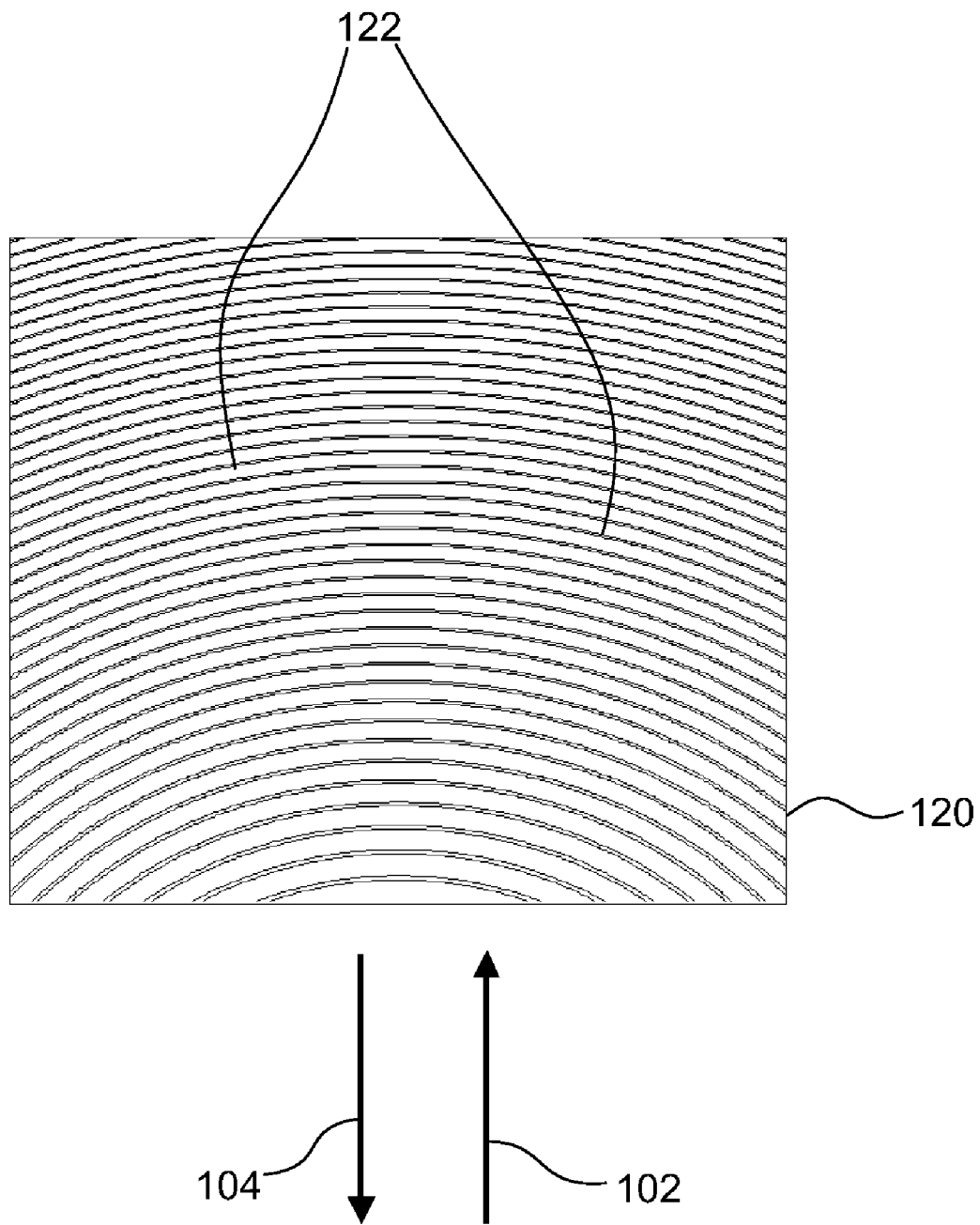
FIG. 3 illustrates schematically an exemplary derived arrangement of diffractive elements formed on a substrate.

FIG. 3 depicts the diffractive contours deduced from an interferogram calculated with simulated input/output beams having the geometry shown in FIG. 1, i.e. near Littrow configuration with a diverging input beam transformed to a converging output beam. In FIG. 3, it is assumed that a plane of incidence contains the normal vector to the substrate face (the surface having the diffractive elements) and the central propagation vectors of both the input and output beams and is oriented substantially vertically and extending perpendicularly from the plane of the figure (which is assumed to contain the substrate surface). This arrangement is not necessary, but facilitates discussion of FIG. 3. The diffractive contours are defined by constant phase difference contours in the interferogram. The angle of the substrate surface relative to the input and output beams is as schematically represented in FIG. 1. The geometry or arrangement of diffractive elements 122 shown in FIG. 3 when formed on the substrate 120 will provide for focusing of divergent input beam 102 to output port 108. When an input beam 102 of a wavelength other than the design wavelength is incident on the surface grating along the design direction, the output beam 108 will still converge, but will be angularly displaced in the previously defined plane of incidence. Dispersion of the angular displacement of various wavelengths also leads to spatial dispersion of the output focal spot. A surficial diffractive structure like that shown in FIG. 3 provides for spectrometer-like function with only a single optical component.

Figures 4A, 4B:
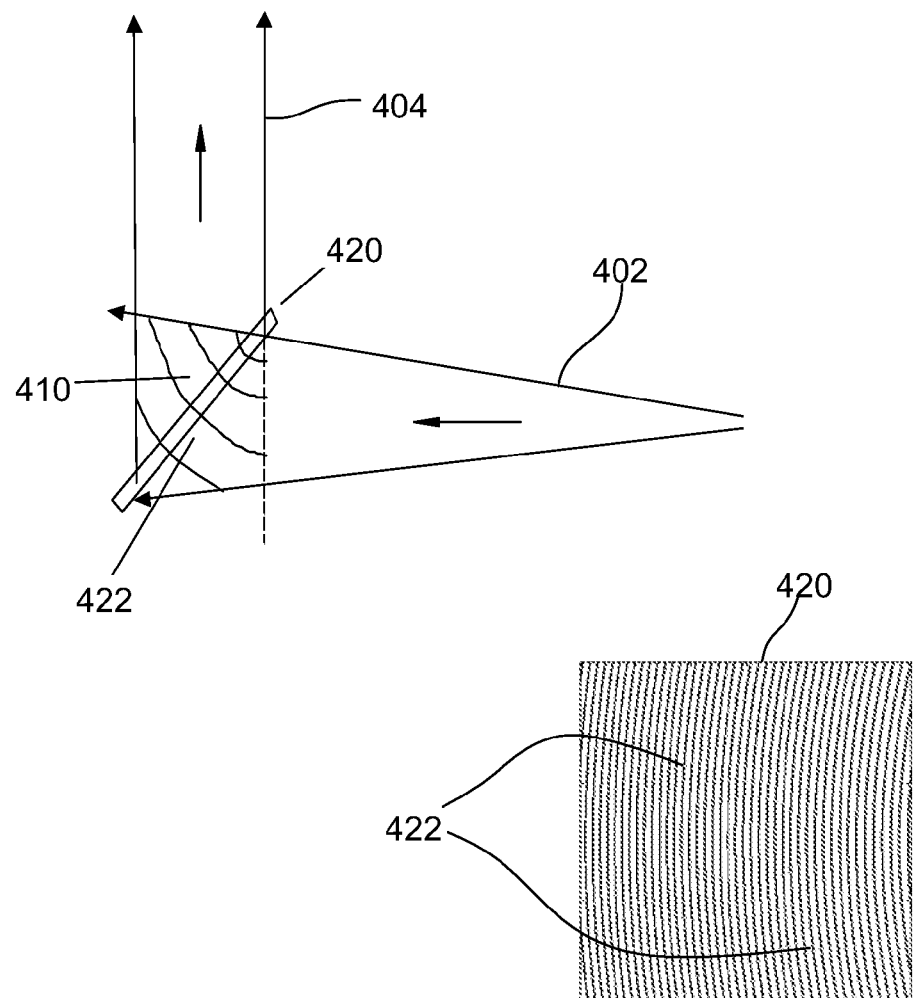
FIG. 4a illustrates schematically computed interference of optical beams at a substrate interface.
FIG. 4b illustrates schematically an exemplary derived arrangement of diffractive elements formed on a substrate.

FIG. 4a shows the diffractive contour pattern computed from an interferogram 410 between the shown divergent input beam 402 and collimated output beam 404. The central wavevectors of input and output beams 402/404 and the surface normal vector of substrate 420 in this example lie in the plane of the figure to facilitate description. In FIG. 4b, a view (along the surface normal vector) of the substrate 420 with derived diffractive contours 422 is shown. The diffractive contours 422 are curves on the surface of the substrate 420 running primarily vertically.

Generally, the surficial diffractive elements have the form of curved lines and have a spatial period chirp. In cases when the wavevectors of the input and output beams and the substrate normal lie a common plane of incidence, referred to as the input-output plane, the wavefront transformation property of the diffractive structure may be roughly separated into two parts. In a direction normal to the input-output plane, the wavefront transformation is provided primarily by curvature of the diffractive elements. In the direction parallel to the input-output plane, wavefront transformation is provided primarily by spatial chirp of the diffractive contour spacing. In making the above separation, it is assumed that the input and output beams travel in directions substantially different than would be expected from the simple specular reflection. As input and output directions become more closely matched to those of specular reflection, wavefront transformation functions becomes less clearly directionally dependent on spatial chirp on one hand and contour curvature on the other. It should be noted that it is not generally necessary for the input, output, and substrate-normal vectors to be co-planar.

It is possible, with some decrease in wavefront transformation fidelity, to approximate the diffractive elements computationally derived from simulated design input and output beams with simple conic section curves such as circular arcs, parabolic arcs, elliptical arcs, or hyperbolic arcs. Such approximation may serve to simplify numerical design algorithms at the cost of imperfect but operationally acceptable wavefront transformation.

The presently disclosed methods for designing substantially optimized diffractive element sets by computed interference of simulated optical signals may be generalized to devices connecting one input port to multiple output ports, multiple input ports to one output port, or more complex combinations of one-or-more inputs to one-or-more outputs. Several methods may be used to design and fabricate such devices, which may include multiple diffractive element sets. Discussion of how multiple ports can be coupled by multiple diffractive element sets is given in various of the above-cited references. As previously mentioned, it should be noted that interferograms derived by the previously described methods preserve phase relationships between the simulated design input and output optical fields. In devices combining two or more input fields into a single output field this may lead to a sensitivity of the power coupled in the output field to the specific relative phase of the input fields. As phase relationships between physical input fields input to a fabricated device change or deviate from those between the simulated design input fields, the output powers and spatial configurations may change.

Figure 5:
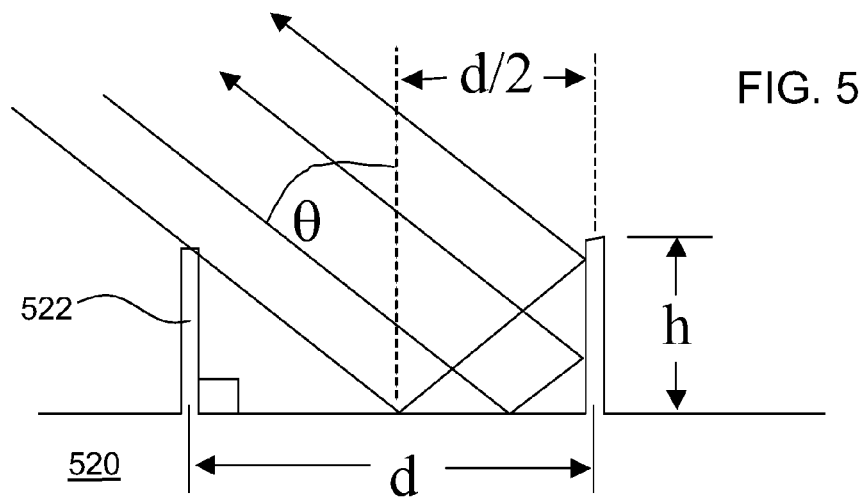
FIG. 5 illustrates schematically an exemplary arrangement for blazing an optical surface grating.

In designing surficial diffractive structures, it is important to form diffractive contours whose diffractive efficiency is high. It is often desirable to convert into desired output beams as much of the input optical power as possible or practicable. One approach to achieving high efficiency is shown schematically in FIG. 5. Light directed into a square corner in two-dimensions is substantially retroreflected along the same direction in which it was incident. This corner reflective property can be implemented in diffractive contour design to achieve enhanced diffraction efficiency when the diffractive structure is operated near a Littrow configuration (i.e. input angle of incidence nearly equal to output angle of incidence). The use of corner reflective properties to enhance diffracted signal efficiency shall be referred to as "corner blazing." In FIG. 5, two rays are shown incident on diffractive contours having the form of thin vertical ribs 522 formed on substrate 520 (equivalently, the diffractive contours may be regarded as the trenches between the vertical ribs 522). Light incident at angle $\theta$ may strike the substrate along the side of the rib or along the substrate surface between ribs. Rays incident in either of these regions will be back reflected and produce enhanced Littrow or near-Littrow diffractive scattering. In order for near-Littrow operation to be achieved, the condition $d=m\lambda/2 \sin\theta$ (grating equation) should also be approximately satisfied where d represents the spacing of the diffractive contours. The height of the diffractive ribs, h, can be set to $h=d/2 \tan\theta$, assuming that the ribs are thin relative to the element spacing d. Generally, the height of the ribs 522 should be set so that the light incident on the side of the rib is directed toward the substrate surface and fills half the gap between ribs. When the spacing of diffractive contours varies across a diffractive structure and a single etch depth is employed, the corner blaze condition ($d=m\lambda/2 \sin\theta$ and $h=d/2 \tan\theta$) will not be perfectly satisfied across the entire device. As evident from FIG. 5, the width of the diffractive ribs may be minimized to produce greatest efficiency, or the rib width may vary along with the spatial chirp to achieve substantially uniform diffractive efficiency while still employing a single etch depth. Alternatively, variable etch, impressive, molding, stamping, or embossing depth may be employed across the device to provide uniform diffractive efficiency.

Figure 6A:
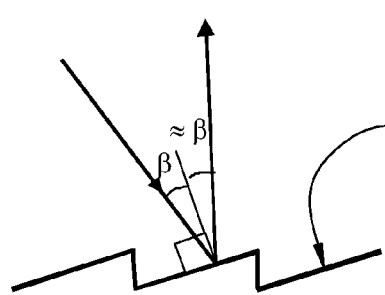
FIGS. 6a and 6b illustrate schematically prior art blazing of an optical surface grating.
Figure 6B:
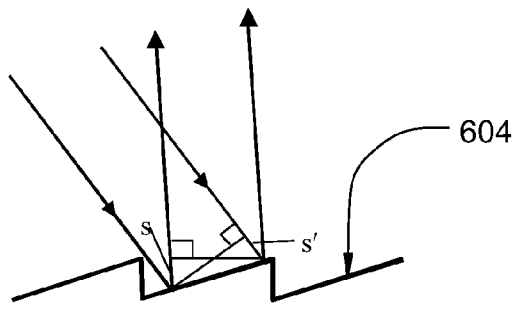
Figure 6C:
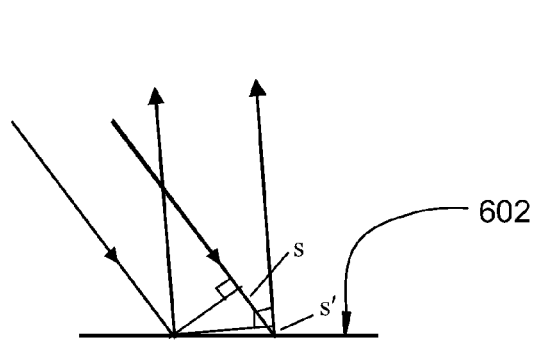
FIG. 6c illustrates schematically calculation of phase differences between diffracted optical signals.
Figure 6D:
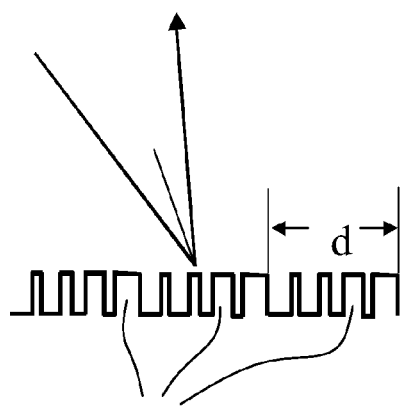
FIG. 6d illustrates schematically a blazed optical surface grating according to the present disclosure.

FIGS. 6a and 6b illustrate prior art approaches to blazing a diffraction grating, while FIGS. 6c and 6d illustrate an alternative approach to blazing that is compatible with binary lithography and may be applied at a wide variety of input/output relative angles. In FIGS. 6a and 6b the facets 601 are angled so that light diffracting from them from the input to the output directions approximately obeys the law of reflection, i.e., input and output angles (relative to the surface normal) are equal. In FIG. 6b, the traditional blaze method is examined further through the depiction of two rays from an input plane wave that strike opposite edges of a grating facet 601. When the input and output rays satisfy the law of reflection relative to the facet normal, the path difference between the two rays (s–s') is nearly zero or small compared to the wavelength of the input beam. In FIG. 6c, two rays, oriented as in FIG. 6b, interact with a horizontal surface 602, resulting in a path difference of $s+s'\neq 0$ and a corresponding phase error of $2\pi(s+s')/\lambda$. Reflection does not normally occur with the ray angles shown because rays contributing to different portions of the output wavefront destructively interfere.

In FIG. 6d an alternative approach to blazing a surface grating is schematically illustrated that is consistent with a binary etch process. If the phase of the field diffracted across the diffractive facet (of length d), can be made to vary by the amount $2\pi(s+s')/\lambda$, rays contributing to the output field remain substantially in phase and the diffracted field in the output direction is relatively enhanced. This may be achieved by etching, in each grating period d, a series of ribs 622 of various spacings and thicknesses. Light diffracted from the etched surface consists of a part that diffracts primarily from the top of the ribs 622 and a part that diffracts primarily from the trenches (etched regions) between ribs 622. Typically the spacing and the thickness of the ribs 622 are comparable to or smaller than the design wavelength of the grating. The net field diffracted from each grating period is the sum of rib-diffracted and trench-diffracted light. The top-diffracted and trench-diffracted light is of different phase. By controlling the width of the ribs and trenches along with the trench depth, the net local diffracted field phase may be made to substantially mimic the effect of a traditional blaze (FIG. 6a) wherein the phase varies by $2\pi(s+s')/\lambda$ across the width of the facet. Here a facet width d spans the distance between two diffractive contours defined by interferogram constant phase contours. The rib widths and trench depths necessary to effect the desired phase gradient across the facet width can be calculated using standard methods for solving the electromagnetic propagation equations either commercially available or otherwise known in the art.

As mentioned earlier, amplitude and phase apodization methods applicable to surficial diffractive contours are discussed in the cited references. These methods may be employed to ensure that output beams have desired propagation properties (convergent, divergent, collimated). Alternatively, tailoring the spatial profile of the input beam to fall entirely within the extent of the diffractive structure with intensity fall off apodized may be employed to tailor the spatial properties of the output optical beam.

In the exemplary embodiments disclosed herein, specific dimensions and materials may have been recited. It should be understood that use of such dimensions and materials is for illustrative purposes only and should not be construed as limiting the scope of the present disclosure or appended claims. Within the scope of the present disclosure or appended claims, a wide range of materials (including but not limited to polymers, plastics, various glasses, and semi-conductor materials) may be employed as substrates for the diffractive elements. It should also be understood that the structure of diffractive elements in the exemplary embodiments is for illustrative purposes only, and that sets of diffractive elements of various topologies using any appropriate fabrication processes shall fall within the scope of the present disclosure or appended claims. Suitable fabrication processes for forming a diffractive element set may include, but are not limited to, stamping, ion exchange, lithographic scribing, injection molding, electro-forming, embossing, spin-coating, injection molding, roll-pressing, UV-curing, laser or proton beam direct writing, or stamping. Projection lithography with scale change from mask to substrate provides useful access to patterning tools with resolution insufficient to directly scribe diffractive element patterns.

It should be noted that many of the embodiments depicted in this disclosure are only shown schematically, and that not all the features may be shown in full detail or in proper proportion and/or location. Certain features or structures may be exaggerated relative to others for clarity. In particular, it should be noted that the numbers of diffractive elements in an actual device may typically be larger than that shown in the Figures. The numbers of diffractive elements may be reduced in some Figures for clarity. It should be further noted that the embodiments shown in the Figures are exemplary only, and should not be construed as specifically limiting the scope of the written description or the claims set forth herein. It is intended that equivalents of the disclosed exemplary embodiments and methods shall fall within the scope of the present disclosure. It is intended that the disclosed exemplary embodiments and methods, and equivalents thereof, may be modified while remaining within the scope of the present disclosure.

A method comprises: formulating a simulated design input optical signal propagating toward and through a diffracting volume from a designed optical input port as a diffraction-guided optical beam; formulating a simulated design output optical signal propagating through and away from a diffracting volume to a designed optical output port as a diffraction-guided optical beam; computing an interference pattern between the simulated input and output optical signals over a design diffracting surface in the diffracting volume; computationally deriving an arrangement of a set of diffractive elements on the design surface from the computed interference pattern, so that when the diffractive element set is formed on a substrate surface substantially conforming to the design surface, the diffractive element set would route, as an output optical signal propagating to the output optical port, a diffracted portion of an input optical signal propagating from the input optical and incident on the diffractive element set that is diffracted by the diffractive element set; forming at a desired mask size scale a mask with a mask pattern corresponding to the diffractive element set; forming the diffractive element set on the substrate surface by projecting the mask pattern onto the substrate surface at a desired projection size scale. The mask size scale (i.e., the ratio of the size of the mask pattern to the size of the derived arrangement of the diffractive elements) may be chosen so that the mask features may be fabricated on a size scale larger than that of the derived arrangement of the diffractive elements (mask size scale greater than unity), potentially enabling use of more economical or scalable fabrication tools for making the mask, or enabling fabrication of diffractive elements on a size scale not readily attainable by available mask-fabrication methods or tools. The projection size scale (i.e., the ratio of the size of the diffractive elements set formed on the substrate to the size of the mask pattern) may be chosen to form diffractive elements of the same size as the corresponding features of the derived arrangement of the diffractive elements (projection size scale less than unity, and the product of the mask and projection size scales substantially equal to unity), or may be chosen to form the diffractive elements on any other desired size. In the latter case, the product of the mask size scale and the projection size scale may differ substantially from unity, and may allow fabrication of diffractive element sets of various design wavelengths using a single mask derived from a single computed interference pattern.

The diffractive elements may be formed on the substrate surface by binary projection lithography, in which only a single etch depth is employed. Such binary methods may typically be more readily, reliably, or reproducibly implemented than other multi-level, grayscale, or analog methods.

Projection lithography may be employed as a production method for forming multiple surface gratings with diffractive element sets. Alternatively, multiple replica diffractive element sets on multiple corresponding substrate surfaces may be formed by stamping, embossing, pressing, electro-forming, or molding, using a master formed by projection lithography or using a secondary master formed from the master.

The diffractive element set may be made by forming each diffractive element as at least one trench between ribs projecting from the substrate surface (equivalently, as at least one rib projecting from the substrate surface between trenches). The computationally derived arrangement of the diffractive elements may include the relative widths of each trench and an adjacent rib, and the depth of the trenches. As described hereinabove, the depth and relative widths at least in part determine diffractive strength of each diffractive element. The side surfaces of the trenches may be formed substantially perpendicular to the substrate surface, so that the diffractive element set formed on the substrate may exhibit relatively enhanced diffraction efficiency near a Littrow arrangement of the input and output optical ports relative to the substrate.

The fabrication methods disclosed herein may be most readily implemented on a substantially planar substrate surface. However, implementation of the fabrication methods disclosed herein, as well as the optical apparatus formed thereby or disclosed herein, wherein the diffractive elements are formed on a curved or otherwise non-planar surface shall also fall within the scope of the present disclosure or appended claims.

A reflective surface grating may be formed, wherein the substrate surface or the diffractive element set is reflective over a desired operational wavelength range. Reflectivity may arise from index contrast of the substrate or diffractive elements with a surrounding medium or with a protective overcoat, or may be provided by a reflective coating (e.g. metal or dielectric coating) formed over the diffractive element or substrate surface. A transmission grating may be formed, wherein the substrate or the diffractive element set is substantially transparent over a desired operational wavelength range. Such a transmission grating may further comprise a substantially transparent coating (e.g. dielectric coating) formed over the diffractive elements.

An optical apparatus comprises a set of diffractive elements on a substrate and arranged for (i) receiving at least a portion of an input optical signal propagating from an input port as a diffraction-guided optical beam, (ii) diffracting a portion of the received input optical signal as an output optical signal, and (iii) routing the output optical signal to propagate to the output optical port as a diffraction-guided optical beam. The arrangement of the diffractive elements is computationally derived from an interference pattern computed from interference at a surface of the substrate between a simulated design input optical signal and a simulated design output optical signal, as described hereinabove. The apparatus may further include various additional features, arrangements, or adaptations disclosed herein, and may be fabricated according to any of the various methods disclosed herein. Input and output beams may propagate in free space with diffractive elements formed at the interface between free space and a metallic, dielectric, semiconductor, or other convenient substrate. One or the other or both of said beams may alternatively propagate within a transparent material such as glass, polymer, or appropriate semiconductor with the diffractive elements formed on an exterior surface of the transparent material or on an interior interface between materials of different refractive index.

An optical spectrometer (FIGS. 7A and 7B) comprises: an input optical port 706 for receiving an input optical signal 702 into the spectrometer; an output optical port 708 for transmitting an output optical signal 704 out of the spectrometer; and an optical surface grating comprising a set of diffractive elements 722 on a substrate 720. The diffractive elements are arranged for (i) receiving at least a portion of the input optical signal 702 propagating directly from the input port 706 as a diffraction-guided optical beam, (ii) diffracting a portion of the received input optical signal 702 as the output optical signal 704, and (iii) routing the output optical signal to propagate directly to the output optical port 708 as a diffraction-guided optical beam. The arrangement of the diffractive elements is computationally derived from an interference pattern computed from interference at a surface of the substrate between a simulated design input optical signal and a simulated design output optical signal, as described elsewhere herein, and may include any of the features, arrangements, or adaptations disclosed herein. Alternative to the depiction of FIG. 7A, the diffractive elements 722 may be formed on an exterior surface of a solid, substantially homogeneous medium within which the depicted beams propagate. The entire substrate and diffractive elements may be formed via injection molding or an analogous process, or any other suitable process.

Figure 7A:
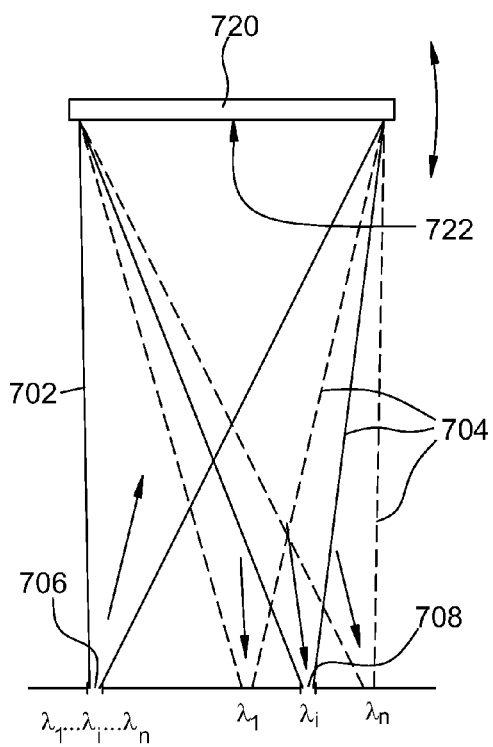
FIGS. 7a and 7b illustrate schematically exemplary optical spectrometers incorporating optical surface gratings according to the present disclosure.
Figure 7B:
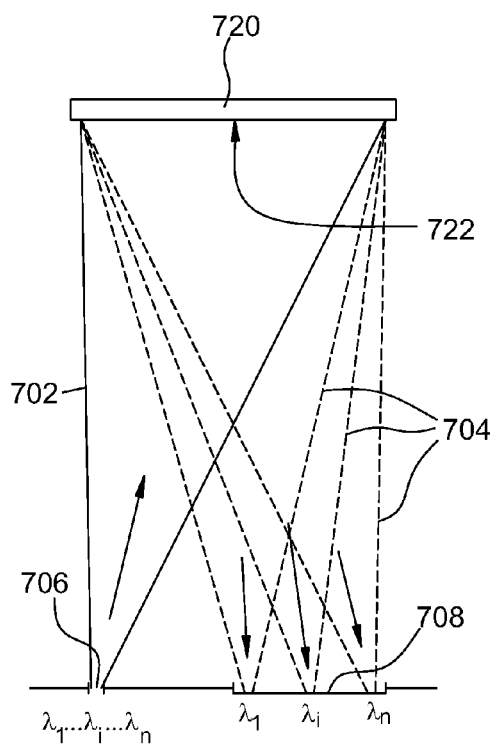

In FIGS. 7A and 7B, the input signal 702 may include multiple wavelengths $\lambda_1 \ldots \lambda_i \ldots \lambda_n$. In FIG. 7A, output port 708 is arranged to transmit only a subset of the incident wavelengths from the spectrometer, which may be scanned by rotating the substrate 720 with the diffractive elements thereon. In FIG. 7B, the substrate 720 and diffractive elements 722 are held in a fixed position, while output port 708 transmits multiple angularly and spatially dispersed wavelengths from the spectrometer, e.g. for multi-channel detection. Use of a surface grating designed and fabricated as disclosed herein enables construction of a spectrometer without use of a curved grating or use of additional collimation or focusing optics.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or", "only one of . . . ", or similar language; or (ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. An optical apparatus, comprising a set of diffractive elements on a substrate that are arranged: (i) to receive at least a portion of an input optical signal propagating from an input optical port as a diffraction-guided optical beam, (ii) to diffract a portion of the received input optical signal as an output optical signal, (iii) to route the output optical signal to propagate to an output optical port as a diffraction-guided optical beam, and (iv) to exhibit a positional variation in diffractive amplitude, optical separation, or spatial phase over some portion of the set, wherein the arrangement of the diffractive elements corresponds to an interference pattern derived from computed interference at a surface of the substrate between a simulated design input optical signal and a simulated design output optical signal, wherein:

each diffractive element comprises at least one trench segment positioned along a path defined by a corresponding constant-phase contour of the interference pattern; and each trench segment is substantially rectangular or trapezoidal in transverse cross section.

2. The apparatus of claim 1, wherein the trench segments are formed on the substrate surface by binary projection lithography.

3. The apparatus of claim 2, wherein the arrangement of the diffractive elements includes (i) relative widths of each trench segment or an adjacent rib, (ii) depth of the trench segments, and (iii) displacement of each trench segment relative to the corresponding constant-phase contour, the depth, relative widths, and displacements at least in part determining relative diffractive strength of each diffractive element.

4. The apparatus of claim 3, wherein each trench segment is substantially rectangular in transverse cross section, so that the diffractive element set formed on the substrate exhibits relatively enhanced diffraction efficiency near a Littrow arrangement of the input and output optical ports relative to the substrate.

5. The apparatus of claim 1, wherein the substrate surface is substantially planar.

6. The apparatus of claim 5, wherein the diffractive element set is arranged so that the respective wavefronts of the input and output optical signals exhibit differing convergence, divergence, or collimation properties.

7. The apparatus of claim 1, wherein the substrate surface or the diffractive element set is reflective over a desired operational wavelength range, the diffractive elements and the substrate thereby comprising a reflective surface grating.

8. The apparatus of claim 7, further comprising a coating formed over the diffractive element set and the substrate surface so as to impart reflectivity over the desired operational wavelength range.

9. An optical spectrometer, comprising:

an input optical port for receiving an input optical signal into the spectrometer;

an output optical port for transmitting an output optical signal out of the spectrometer; and an optical surface grating comprising a set of diffractive elements on a substrate that are arranged: (i) to receive at least a portion of an input optical signal propagating from an input optical port as a diffraction-guided optical beam, (ii) to diffract a portion of the received input optical signal as an output optical signal, (iii) to route the output optical signal to propagate to an output optical port as a diffraction-guided optical beam, and (iv) to exhibit a positional variation in diffractive amplitude, optical separation, or spatial phase over some portion of the set, wherein the arrangement of the diffractive elements corresponds to an interference pattern derived from computed interference at a surface of the substrate between a simulated design input optical signal and a simulated design output optical signal, wherein:

each diffractive element comprises at least one trench segment positioned along a path defined by a corresponding constant-phase contour of the interference pattern; and each trench segment is substantially rectangular or trapezoidal in transverse cross section.

10. A method, comprising:

formulating a simulated design input optical signal propagating toward and through a diffracting volume from a designed optical input port as a diffraction-guided optical beam;

formulating a simulated design output optical signal propagating through and away from a diffracting volume to a designed optical output port as a diffraction-guided optical beam;

computing an interference pattern between the simulated input and output optical signals over a design diffracting surface in the diffracting volume;

computationally deriving an arrangement of a set of diffractive elements on the design surface from the computed interference pattern, so that when the diffractive element set is formed on a substrate surface substantially conforming to the design surface, the diffractive element set would route, as an output optical signal propagating to the output optical port, a diffracted portion of an input optical signal propagating from the input optical and incident on the diffractive element set that is diffracted by the diffractive element set, wherein the arrangement of diffractive elements exhibits a positional variation in diffractive amplitude, optical separation, or spatial phase over some portion of the set;

forming at a desired mask size scale a mask with a mask pattern corresponding to the derived arrangement of the diffractive element set;

forming the diffractive element set on the substrate surface by projecting the mask pattern onto the substrate surface at a desired projection size scale and then forming the diffractive elements as a set of corresponding trench segments having substantially rectangular or trapezoidal transverse cross sections.

11. The method of claim 10, wherein the product of the mask size scale and the projection size scale is substantially equal to unity.

12. The method of claim 10, wherein the product of the mask size scale and the projection size scale differs substantially from unity.

13. The method of claim 10, wherein the diffractive elements are formed on the substrate surface by binary projection lithography.

14. The method of claim 13, further comprising forming multiple replica diffractive element sets on multiple corresponding substrate surfaces by stamping, embossing, pressing, or molding employing the first diffractive element set as a master or employing a secondary master formed from the first diffractive element set.

15. The method of claim 13, wherein the arrangement of the diffractive elements includes (i) relative widths of each trench segment or an adjacent rib, (ii) depth of the trench segments, and (iii) displacement of each trench segment relative to the corresponding constant-phase contour, the depth, relative widths, and displacements at least in part determining relative diffractive strength of each diffractive element.

16. The method of claim 15, wherein each trench segment is substantially rectangular in transverse cross section, so that the diffractive element set formed on the substrate exhibits relatively enhanced diffraction efficiency near a Littrow arrangement of the input and output optical ports relative to the substrate.

17. The method of claim 10, wherein the substrate surface is substantially planar.

18. The method of claim 17 wherein the diffractive element set is arranged so that the respective wavefronts of the input and output optical signals exhibit differing convergence, divergence, or collimation properties.

19. The method of claim 10, wherein the substrate surface or the diffractive element set is reflective over a desired operational wavelength range, the diffractive elements and the substrate thereby comprising a reflective surface grating.

20. The method of claim 19, further comprising forming a coating over the diffractive element set or the substrate surface so as to impart reflectivity over the desired operational wavelength range.

* * * * *